US009928164B2

(12) United States Patent
Goto et al.

(10) Patent No.: US 9,928,164 B2
(45) Date of Patent: Mar. 27, 2018

(54) INFORMATION PROCESSING APPARATUS

(71) Applicant: INTERNATIONAL BUSINESS MACHINES CORPORATION, Armonk, NY (US)

(72) Inventors: Mayumi Goto, Tokyo (JP); Noriaki Takatsu, Tokyo (JP); Atsushi Yokoi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 13/676,205

(22) Filed: Nov. 14, 2012

(65) Prior Publication Data

US 2013/0124817 A1   May 16, 2013

(30) Foreign Application Priority Data

Nov. 14, 2011   (JP) .................................. 2011-248351

(51) Int. Cl.
G06F 12/02       (2006.01)
G06F 3/06        (2006.01)

(52) U.S. Cl.
CPC ............ *G06F 12/02* (2013.01); *G06F 3/0605* (2013.01); *G06F 3/0631* (2013.01); *G06F 3/0689* (2013.01)

(58) Field of Classification Search
CPC ....... G06F 3/0628; G06F 3/061; G06F 3/0617
See application file for complete search history.

(56) References Cited

U.S. PATENT DOCUMENTS

| 6,324,620 | B1 * | 11/2001 | Christenson et al. ........ 711/112 |
| 6,912,585 | B2 * | 6/2005 | Taylor et al. ................. 709/231 |
| 7,631,023 | B1 * | 12/2009 | Kaiser et al. ................. 711/114 |
| 8,380,942 | B1 * | 2/2013 | Corddry et al. .............. 711/154 |
| 2003/0140207 | A1 | 7/2003 | Nagase et al. |
| 2005/0038959 | A1 * | 2/2005 | Yagi et al. .................... 711/114 |
| 2005/0177546 | A1 | 8/2005 | Nakano et al. |
| 2006/0080350 | A1 | 4/2006 | Mark |
| 2006/0282636 | A1 | 12/2006 | Yamamoto et al. |

(Continued)

FOREIGN PATENT DOCUMENTS

| GB | 2497172 B | 1/2014 |
| JP | 05-151013 A | 6/1993 |

(Continued)

OTHER PUBLICATIONS

UK Appln. No. GB1219836.2, Search Report, dated Mar. 26, 2013, 1 pg.

*Primary Examiner* — Prasith Thammavong
*Assistant Examiner* — Jason W Blust
(74) *Attorney, Agent, or Firm* — Cuenot, Forsythe & Kim, LLC

(57) ABSTRACT

Performing data processing for data sets stored in each of a plurality of storage devices includes collecting access data indicating details of accesses to each of the plurality of storage devices and computing predicted changes in access frequency for each of the storage devices on the basis of the access data for each of the plurality of storage devices in response to a request to reserve a storage area for storing a new data set. A storage device in which the storage area for storing the new data set is to be reserved is selected from among the plurality of storage devices on the basis of the predicted changes for each storage device.

18 Claims, 4 Drawing Sheets

(56) References Cited

U.S. PATENT DOCUMENTS

| | | | |
|---|---|---|---|
| 2008/0126704 A1* | 5/2008 | Ulrich et al. | 711/114 |
| 2008/0270696 A1 | 10/2008 | Murayama et al. | |
| 2009/0132621 A1 | 5/2009 | Jensen et al. | |
| 2011/0078405 A1 | 3/2011 | Asano et al. | |
| 2012/0173831 A1* | 7/2012 | Rubio et al. | 711/165 |

FOREIGN PATENT DOCUMENTS

| | | |
|---|---|---|
| JP | 06-222963 A | 8/1994 |
| JP | 07-064931 A | 3/1995 |
| JP | 10-283209 A | 10/1998 |
| JP | 11-055645 A | 2/1999 |
| JP | 2003-216460 A | 7/2003 |
| JP | 2005-078604 A | 3/2005 |
| JP | 2005-216050 A | 8/2005 |
| JP | 2006-343907 A | 12/2006 |
| JP | 2006-343928 A | 12/2006 |
| JP | 2007-122268 A | 5/2007 |
| JP | 2008-269344 A | 11/2008 |
| JP | 2008-269441 A | 11/2008 |
| JP | 2011-070345 A | 4/2011 |
| JP | 2013105293 A | 5/2013 |
| WO | 2008007348 A1 | 1/2008 |

* cited by examiner

INFORMATION PROCESSING APPARATUS

CROSS-REFERENCE TO RELATED APPLICATIONS

This application claims the benefit of Japan Application Number 2011-248351 filed on Nov. 14, 2011, which is fully incorporated herein by reference.

BACKGROUND

Before a host device (for example a general-purpose computer called a mainframe) executes a process on a new data set, the host device reserves a storage area in any of its storage devices (volumes) for the new data set. In doing so, the host device has to allocate an appropriate storage device to the new data set according to the usage of the new data set.

BRIEF SUMMARY

An information processing apparatus that performs data processing for data sets stored in each of a plurality of storage devices includes a central processing unit programmed to initiate executable operations. The executable operations include collecting access data indicating details of accesses to each of the plurality of storage devices and computing predicted changes in access frequency for each of the storage devices on the basis of the access data for each of the plurality of storage devices in response to a request to reserve a storage area for storing a new data set. The executable operations further include selecting, among the plurality of storage devices, a storage device in which the storage area for storing the new data set is to be reserved, on the basis of the predicted changes for each storage device.

A method of data processing for data sets stored in each of a plurality of storage devices includes collecting access data indicating details of accesses to each of the plurality of storage devices and computing, using a central processing unit, predicted changes in access frequency for each of the storage devices on the basis of the access data for each of the plurality of storage devices in response to a request to reserve a storage area for storing a new data set. The method also includes selecting, among the plurality of storage devices, a storage device in which the storage area for storing the new data set is to be reserved, on the basis of the predicted changes for each storage device.

A computer program product for data processing for data sets stored in each of a plurality of storage devices includes a computer readable storage medium having program code embodied therewith. The program code is executable by a central processing unit to perform a method including collecting access data indicating details of accesses to each of the plurality of storage devices by the central processing unit and computing, using a central processing unit, predicted changes in access frequency for each of the storage devices on the basis of the access data for each of the plurality of storage devices in response to a request to reserve a storage area for storing a new data set. The method further includes selecting, among the plurality of storage devices using the central processing unit, a storage device in which the storage area for storing the new data set is to be reserved, on the basis of the predicted changes for each storage device.

DETAILED DESCRIPTION

The present invention relates to an information processing apparatus, a method, and a program for performing data processing.

The host device has to allocate a storage device having a sufficient available space so that an additional storage area (secondary area) can be secured in the storage device when an initially reserved storage area (primary area) is exhausted. The host device also has to allocate an appropriate storage device among a plurality of storage devices in order to prevent access concentration to particular storage devices. The host device also has to reserve a storage device that matches use conditions, for example security requirements, specific to the data set.

However, since situations of accesses to storage devices by the host device change from day to day, it is very difficult to allocate the most appropriate storage device to a new data set while taking future usage of the storage devices into account.

One mode of the present invention provides an information processing apparatus, and a method and program relating to the information processing apparatus. The information processing apparatus performs data processing for data sets stored in each of a plurality of storage devices and includes a collection unit that collects access data indicating details of accesses to each of the plurality of storage devices, a computation unit that computes predicted changes or transition in access frequency for each of the storage devices on the basis of the access data for each of the plurality of storage devices in response to a request to reserve a storage area for storing a new data set, a selection unit that selects, among the plurality of storage devices, a storage device in which the storage area for storing the new data set is to be reserved, on the basis of the predicted changes or transition for each storage device.

The summary given above is not intended to enumerate all of the essential features of the embodiments disclosed within this specification. Furthermore, a subcombination of any of the features can constitute one or more embodiments of the present invention.

While the present invention will be described through an embodiment of the present invention, the embodiment described below does not limit the present invention defined in the claims. Not all combinations of the features described in the embodiment are essential to the solution of the present invention.

Figure 1:
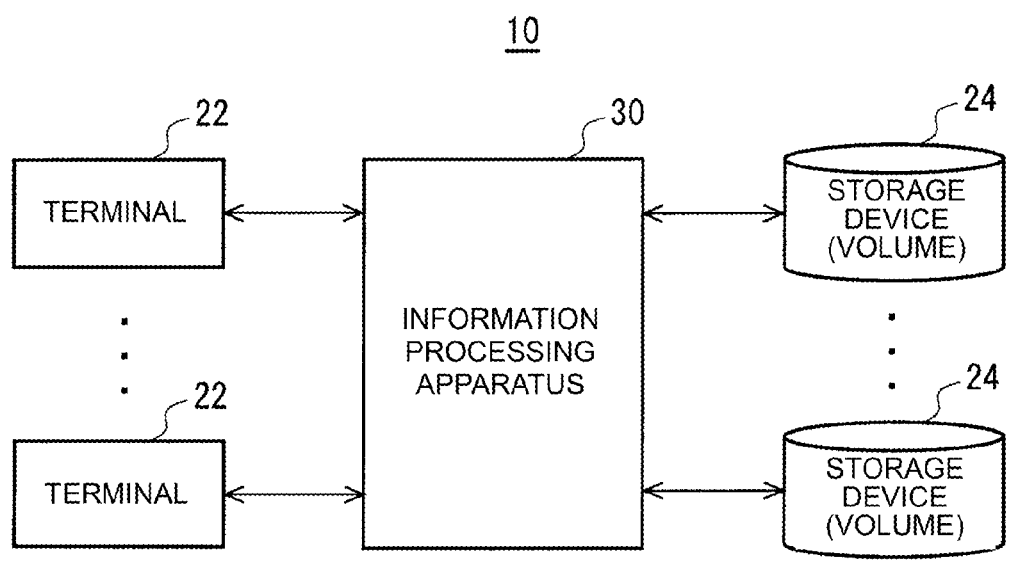
FIG. 1 illustrates a configuration of a computing system according to an embodiment.

FIG. 1 illustrates a configuration of a computing system 10 according to an embodiment. The computing system 10 may be a general-purpose computer called a mainframe, for example, and executes various kinds of data processing such as computations, control processing and data management.

The computing system 10 includes a plurality of terminals 22, a plurality of storage devices 24, and an information processing apparatus 30. Each of the terminals 22 is connected to the information processing apparatus 30 through a network. Each of the terminals 22 sends information input by a user to the information processing apparatus 30 and outputs information from the information processing apparatus 30 to the user.

Each of the storage devices 24 is accessed by the information processing apparatus 30 and stores data handled by the information processing apparatus 30. Each of the storage devices 24 may be any drive unit using any recording medium, such as a disk drive device which records and reads data on disk recording media or a tape drive device which records and reads data on tape recording media. One storage device 24 may include a plurality of recording media. One storage device 24 may be a drive device that records and reads data in subareas into which the recording area of one recording medium is divided.

The plurality of storage devices 24 store data in units called data sets. A data set is a data unit that is structured according to predetermined rules, to be handled by computer, and may have the same structure as a data unit called a file and a document.

Here, one data set is stored as a unit in a storage area in a storage device 24. Before a new data set is used, the computing system 10 selects any one of the storage devices 24 and reserves a storage area in the selected storage device for the new data set.

The information processing apparatus 30 executes a software program to perform data processing on a data set stored in each of the storage devices 24. More specifically, the information processing apparatus 30 performs data processing on an appropriate data set on the basis of information input by a user through a terminal 22. The information processing apparatus 30 also outputs the result of data processing on the data set to the user through the terminal 22. The information processing apparatus 30 updates an appropriate data set according to the result of data processing.

Figure 2:
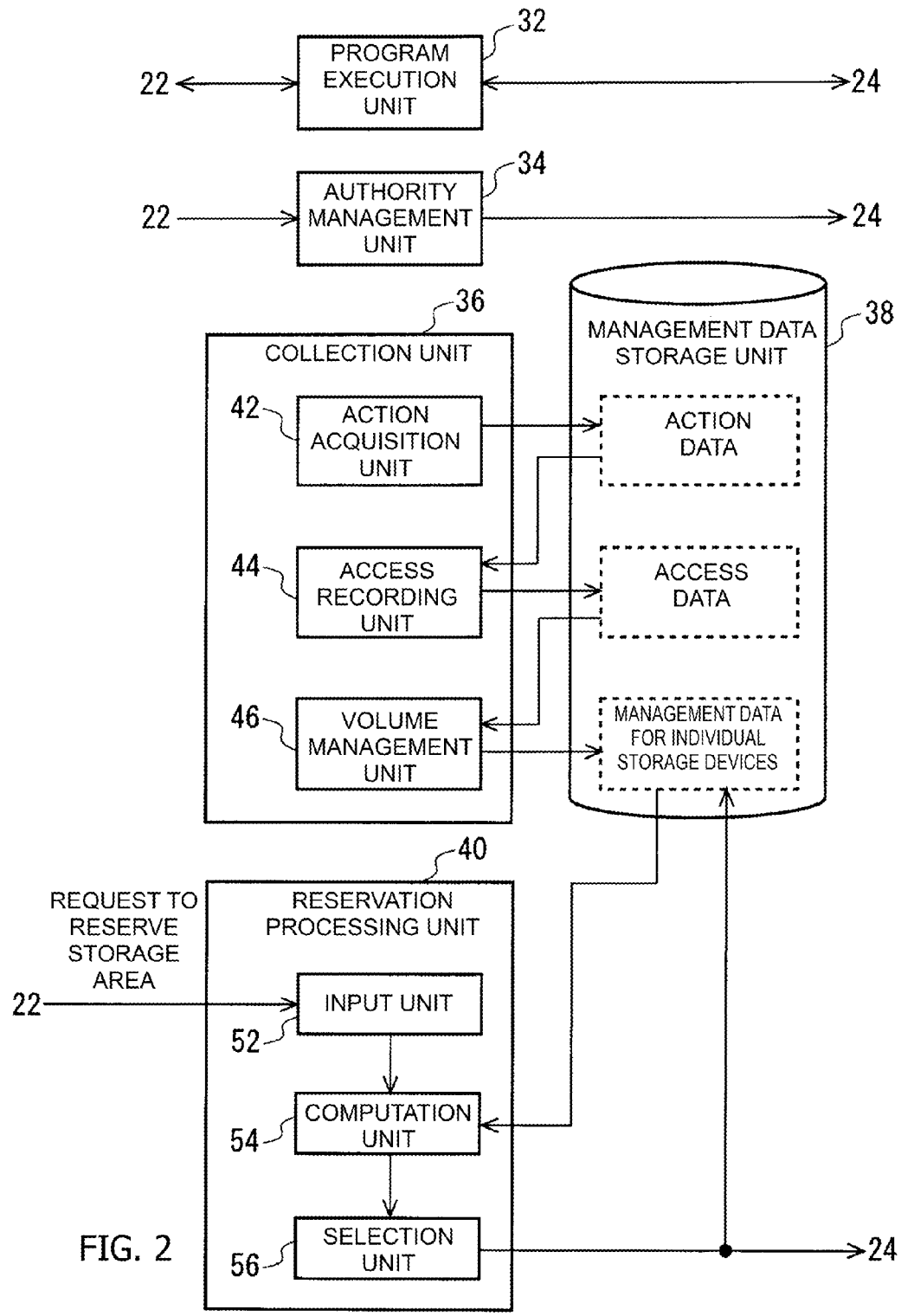
FIG. 2 illustrates a functional configuration of the information processing apparatus according to an embodiment.

FIG. 2 illustrates a functional configuration of an information processing apparatus 30 according to an embodiment. The information processing apparatus 30 executes a software program to implement functions illustrated in FIG. 2. That is, the information processing apparatus 30 includes a program execution unit 32, an authority management unit 34, a collection unit 36, a management data storage unit 38, and a reservation processing unit 40 as functional blocks.

The program execution unit 32 is implemented by executing a software program provided from a user. The program execution unit 32 performs data processing on an appropriate data set and outputs the result of the data processing to an outside destination and/or updates the data set according to the result of the data processing.

The authority management unit 34 manages authorities to access the storage devices 24. That is, when a user attempts to access a storage device 24 accessible only to a user who has a particular authority, the authority management unit 34 checks the authority of the user. If the user attempting to access does not have the authority to access, the authority management unit 34 rejects the access.

The collection unit 36 collects access data indicating details of access to each of the storage devices 24. The management data storage unit 38 stores data managed by the collection unit 36. The management data storage unit 38 may be provided in one or more of the storage devices 24 or provided on a storage medium separate from the storage devices 24.

The collection unit 36 includes an action acquisition unit 42, an access recording unit 44, and a volume management unit 46, for example. The action acquisition unit 42 acquires every action (such as a write, read, and delete) between the information processing apparatus 30 and the storage devices 24 and writes the details of the action and the time of occurrence of the action in the management data storage unit 38 as action data.

The access recording unit 44 writes details of access that occurred between the information processing apparatus 30 and appropriate storage devices 24 in the management data storage unit 38 as access data on a per storage device 24 basis. The access recording unit 44 is called every time the action acquisition unit 42 extracts data required for managing the status of each of the storage device 24 from action data written in the management data storage unit 38 and writes the data into the management data storage unit 38 as access data.

The volume management unit 46 manages the amount of free space of each of the storage devices 24. The volume management unit 46 acquires the names of the storage devices 24 connected to the information processing apparatus 30, information indicating the amount of free space in the storage devices 24 and information about saving in the storage devices 24, organizes those acquired items of information on a per storage device 24 basis and writes the information into the management data storage unit 38 as management data. Saving in a storage device 24 means moving a data set that has not been accessed for a certain period of time, for example, to another, slower storage device 24, for example.

The volume management unit 46 acquires the amounts of free space of the storage devices 24 at regular time intervals during the operation of the information processing apparatus 30 and, when the amount of free space of any of the storage devices 24 changes, updates the management data of the corresponding storage device 24 in the management data storage unit 38. When information concerning saving of any of the storage devices 24 changes, the volume management unit 46 updates the management data of the corresponding storage device 24 in the management data storage unit 38. The volume management unit 46 extracts the access data of any of the storage devices 24 whose free space has changed during a predetermined time period and writes the access data into the management data storage unit 38 as part of the management data of the corresponding storage device 24.

The reservation processing unit 40 selects one of the storage devices 24 in response to a request to reserve a storage area for storing a new data set. The reservation processing unit 40 performs a process for reserving a storage area in the selected storage device 24 for the new data set.

The reservation processing unit 40 includes an input unit 52, a computation unit 54 and a selection unit 56. The input unit 52 acquires a request to reserve a storage area for storing a new data set from a user through a terminal 22. At the same time, the input unit 52 also acquires information required for reserving a storage area.

In response to a request to reserve a storage area for storing a new data set, the computation unit 54 computes predicted changes in the frequency of access to each of the storage devices 24 on the basis of access data associated with each of the storage devices 24 collected by the collection unit 36. Based on the predicted changes in the frequency of access to each storage device 24, the selection unit 56 selects one of the storage devices 24 in which a storage area for storing the new data set is to be reserved. The selection unit 56 then performs processing such as updating management data in the corresponding storage device 24 stored in the management data storage unit 38.

Figure 3:
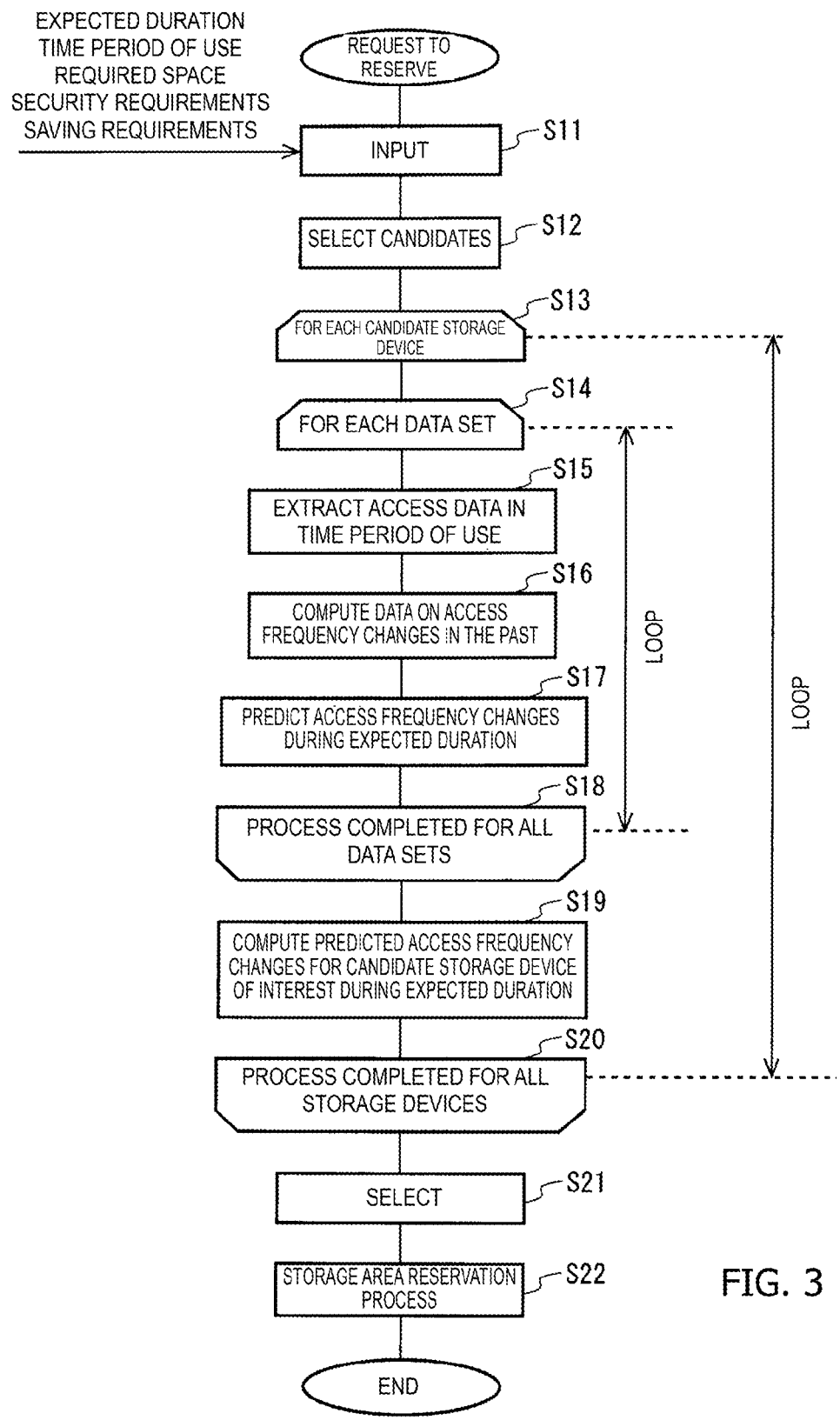
FIG. 3 illustrates a flow of process performed by the information processing apparatus according to the embodiment when a request to reserve a storage area for storing a new data set is issued.

FIG. 3 illustrates a flow of process performed by the information processing apparatus 30 according to an embodiment when a request to reserve a storage device for storing a new data set is issued. When the information processing apparatus 30 receives a request to reserve a storage area to store a new data, the information processing apparatus 30 performs the process illustrated in steps S11 through S22 of FIG. 3.

First, at step S11, the input unit 52 of the information processing apparatus 30 takes an input of an expected duration for which the new data set is expected to be used and a use time period of day during which the new data set is expected to be used, together with the request to reserve the storage area. The expected duration and the use time period of day are input by a user through a terminal 22.

For example, the input unit 52 takes an input of an expected of "3 months from now". The input unit 52 may take an input of the expected duration of "an infinite period from now". The input unit 52 may take an input of a use time period of day, like "from 10:00 a.m. to 16:03". The input unit 52 may also take an input of weekday or holiday as a use time period of day.

Furthermore, the input unit 52 of the information processing apparatus 30 takes inputs of a required amount of space indicating the amount of free space required for storing the new data set, security requirements for a storage device 24 to store the new data set, and saving requirements for the storage device 24 to store the new data set, together with the request to reserve a storage area. The input unit 52 takes an input of a required amount of free space in bytes, for example.

The input unit 52 also takes an input of security requirements, such as using only a storage device available only to preregistered users, or using a storage device 24 available to any users. The input unit 52 takes an input of saving requirements such as using a storage device 24 that transfers a data set to another storage device 24 after the data set has not used for a predetermined period of time, or using a storage device 24 that does not transfer a data set to another storage device 24 under any conditions.

Then, at step S12, the computation unit 54 of the information processing apparatus 30 detects a plurality of storage devices 24 that have at least amounts of free space required for reserving a storage area for storing the new data set as candidate storage devices 24 to be selected. This allows the computation unit 54 to preliminarily exclude storage devices 24 that do not have space available to store at least the new data.

In the detection, the computation unit 54 detects candidate storage devices 24 whose free space is not on the decrease. Thus, the computation unit 54 can avoid selecting storage devices 24 that have free space more than the required space at present but will decrease below the required space.

Furthermore, the computation unit 54 selects candidate storage devices 24 that satisfies security and saving requirements. For example, if security management is applied to users attempting to access, the computation unit 54 selects storage devices 24 that can be protected by security management. If a saving requirement is input, the computation unit 54 selects candidate storage devices 24 that satisfy the saving requirement.

Then, the computation unit 54 of the information processing apparatus 30 executes the loop from step S13 through S20 for each of the candidate storage devices 24. In the loop from step S13 to S20, the computation unit 54 further executes the loop from step S14 through S18 for each of the data sets stored in that storage device 24.

In the loop from step S14 through S18 for each data set, the computation unit 54 first extracts access data concerning access to a data set of interest made in a use time period of day from management data of each storage device in the management data storage unit 38. In this extraction, the computation unit 54 may extract corresponding access data from among the access data on access made during the entire period of time since the first use of the information processing apparatus, or extract corresponding access data from among the access data on access made during a certain past period of time (for example during the past one year).

Then, at step S16, the computation unit 54 computes changes in the frequency of access to the data set in the past on the basis of the extracted access data. Specifically, the computation unit 54 computes data on changes in the frequency of access in the past that represents the frequency of access to the data set of interest in a use time period of day. For example, the computation unit 54 calculates change data representing day-to-day changes in the frequency of access made in the past.

Then, at step S17, the computation unit 54 predicts changes in the frequency of access in the expected duration for the data set of interest on the basis of the change data on the frequency of access in the past. For example, the computation unit 54 may use a fast Fourier transform to separate the change data representing day-to-day changes in the frequency of access to the data set into a plurality of frequency components. The computation unit 54 predicts the waveform of a corresponding frequency component in the expected duration on the basis of the amplitude and phase of the waveforms of the change data separated into frequency components. The computation unit 54 then adds all predicted waveforms of the plurality of frequency components in the expected duration together to generate a waveform representing changes in the frequency of access in the expected duration.

Then, at step S18, the computation unit 54 determines whether or not the process from step S15 through step S17 has been performed on all of the data sets stored in the candidate storage device of interest. When the process has been completed, the computation unit 54 proceeds to step S19; otherwise the computation unit 54 performs the process from step S15 through step S17 on the next data set.

Then, at step S19, the computation unit 54 adds the waveforms representing changes in the access frequencies in the expected duration calculated for all of the data sets stored in the candidate storage device 24 of interest. In this way, the computation unit 54 can compute predicted changes in the frequency of access to the candidate storage device 24 of interest during the expected duration.

Then, at step S20, the computation unit 54 determines whether or not the process from step S14 through step S19 has been performed on all of the candidate storage devices 24. When the process has been completed, the computation unit 54 proceeds to step S21; otherwise the computation unit 54 performs the process from step S14 through step S19 on the next candidate storage device 24.

Then, at step S21, the selection unit 56 of the information processing apparatus 30 selects one appropriate storage device 24 on which a storage area for the new data set is to be reserved on the basis of the predicted changes in the frequency of access to the plurality of candidate storage devices 24 during the expected duration. For example, the selection unit 56 may select a storage device 24 on which a storage area for storing the new data set is to be reserved on the basis of peak values of the predicted changes in the expected duration. For example, the selection unit 56 selects a storage device 24 that has a smallest peak value of the predicted changes during the expected duration among the plurality of candidate storage devices 24.

Alternatively, the selection unit 56 may select a storage device 24 on which a storage area for storing the new data set is to be reserved on the basis of the average values of predicted changes in the expected duration, for example. For example, the selection unit 56 may select a storage device 24 that has the smallest average value of predicted changes in the expected duration among the plurality of candidate storage devices 24.

Then, at step S22, the selection unit 56 of the information processing apparatus 30 performs a reservation process for reserving a storage area in the selected storage device 24 for storing the new data set. For example, the selection unit 56 performs processing such as updating the management data associated with the storage device 24 stored in the management data storage unit 38.

In this way, the information processing apparatus 30 according to this embodiment can predict the frequency of future access to each of the storage devices 24 to allocate an appropriate storage device 24 for storing a new data set. Thus, the information processing apparatus 30 according to this embodiment is capable of allocating an appropriate storage device while taking future usage of storage devices 24 into account.

Figure 4:
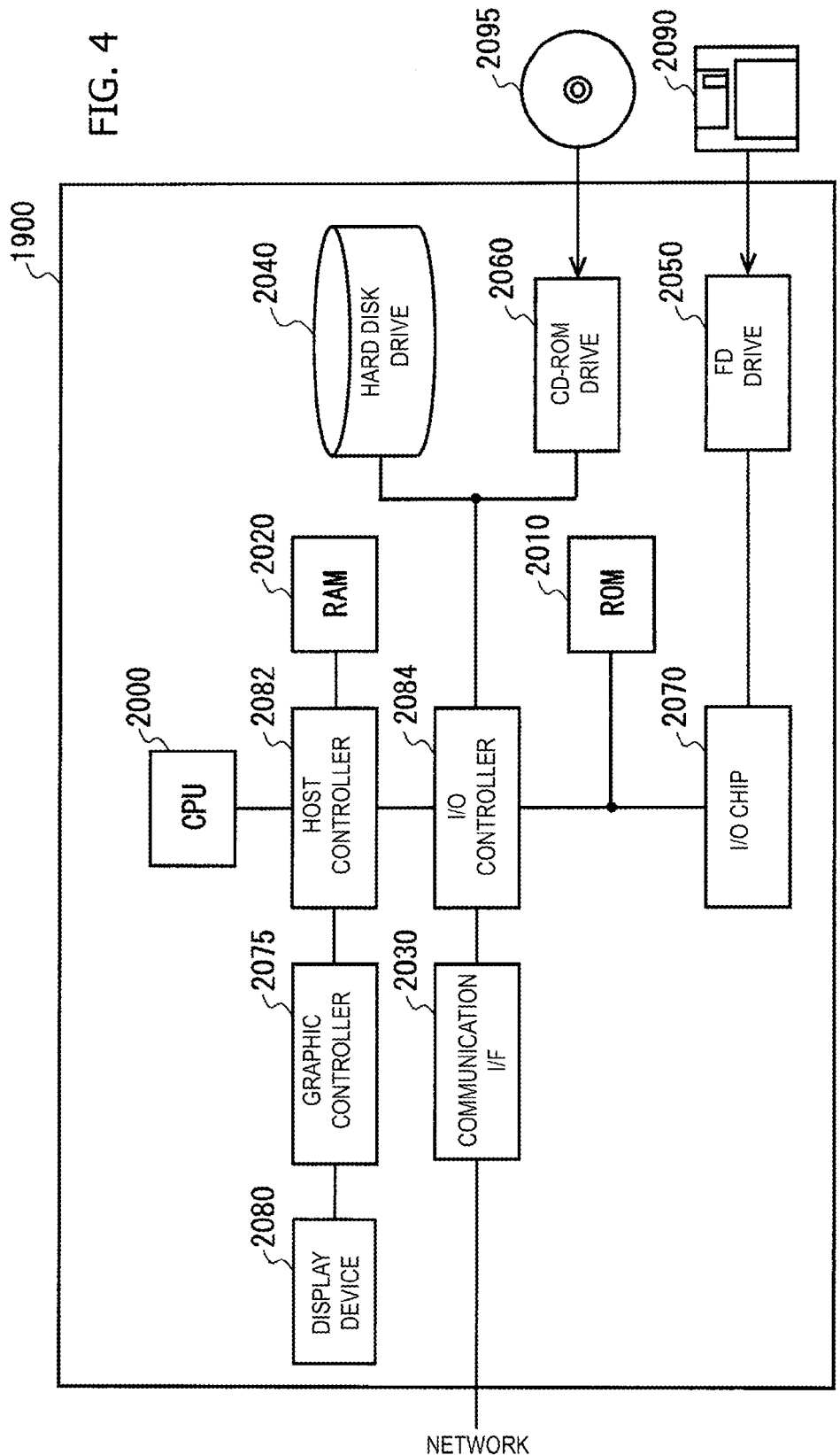
FIG. 4 illustrates an exemplary hardware configuration of a computer.

FIG. 4 illustrates an exemplary hardware configuration of a computer 1900 according to this embodiment. The computer 1900 according to this embodiment includes a CPU section including a CPU 2000, a RAM 2020, a graphic controller 2075, and a display device 2080, which are interconnected through a host controller 2082, and an input/output section including a communication interface 2030, a hard disk drive 2040, and a CD-ROM drive 2060, which are connected to the host controller 2082 through an input/output controller 2084, and a legacy input/output section including a ROM 2010, a flexible disk drive 2050, and an input/output chip 2070, which are connected to the input/output controller 2084.

The host controller 2082 connects the RAM 2020 with the CPU 2000 and the graphic controller 2075, which access the RAM 2020 at high transfer rates. The CPU 2000 operates in accordance with programs stored on the ROM 2010 and the RAM 2020 to control the components. The graphic controller 2075 acquires image data generated by the CPU 2000 or the like on a frame buffer provided on the RAM 2020 and displays the image data on the display device 2080. Alternatively, the graphic controller 2075 may include a frame buffer for storing image data generated by the CPU 2000 or the like.

The input/output controller 2084 connects the host controller 2082 with the communication interface 2030, the hard disk drive 2040, and the CD-ROM drive 2060, which are relatively fast input/output devices. The communication interface 2030 communicates with other apparatuses through a network. The hard disk drive 2040 stores programs and data used by the CPU 2000 inside the computer 1900. The CD-ROM drive 2060 reads a program or data from a CD-ROM 2095 and provides the program or data to the hard disk drive 2040 through the RAM 2020.

Also connected to the input/output controller 2084 are the ROM 2010, the flexible disk drive 2050, and the input/output chip 2070, which are relatively slow input/output devices. The ROM 2010 stores a boot program executed by the computer 1900 during startup and/or programs that are dependent on the hardware of the computer 1900. The flexible disk drive 2050 reads a program or data from a flexible disk 2090 and provides the program or data to the hard disk drive 2040 through the RAM 2020. The input/output chip 2070 connects the flexible disk drive 2050 to the input/output controller 2084 and also connects various input/output devices to the input/output controller through a parallel port, a serial port, a keyboard port, a mouse port or the like.

Programs to be provided to the hard disk drive 2040 through the RAM 2020 are stored on recording media such as a flexible disk 2090, a CD-ROM 2095, or an IC card and are provided by a user. The programs are read from the recording media, are installed to the hard disk drive 2040 in the computer 1900 through the RAM 2020, and are executed by the CPU 2000.

A program which is installed in the computer 1900 and causes the computer 1900 to function as the information processing apparatus 30 includes a program execution module, an authority management module, a collection module, a management data storage module, and a reservation processing module. The program or the modules cause the CPU 2000 to function as the program execution unit 32, the authority management unit 34, the collection unit 36, the management data storage unit 38, and the reservation processing unit 40.

Information processes described in the programs are read by the computer 1900 and function as the program execution unit 32, the authority management unit 34, the collection unit 36, the management data storage unit 38, and the reservation processing unit 40, which are specific means implemented by cooperation of software and the hardware resources described above. These specific means compute or process information in accordance with the intended use of the computer 1900 in this embodiment to configure the information processing apparatus 30 in accordance with the intended use.

For example, when the computer 1900 communicates with an external apparatus, the CPU 2000 executes a communication program loaded on the RAM 2020 and directs the communication interface 2030 to perform communication processing in accordance with descriptions of the processing in the communication program. Under the control of the CPU 2000, the communication interface 2030 reads out send data stored in a send buffer area provided on a storage device such as the RAM 2020, the hard disk drive 2040, the flexible disk 2090, or the CD-ROM 2095 and sends the send data to a network, or writes data received from a network into a receive buffer area provided on a storage device. In this way, the communication interface 2030 can transfer send/receive data to and from a storage device using DMA (Direct Memory Access). Alternatively, the CPU 2000 may read out data from a source storage device or the communication interface 2030 and may write the data to a destination communication interface 2030 or storage device, thereby transferring the send/receive data.

The CPU 2000 reads all or necessary portion of the files or databases stored in an external storage device such as the hard disk drive 2040, the CD-ROM drive 2060 (CD-ROM 2095), or the flexible disk drive 2050 (flexible disk 2090) onto the RAM 2020 through DMA transfer or the like and performs various kinds of processing on the data on the RAM 2020. The CPU 2000 writes the processed data back to the external storage device through DMA transfer or the like. Since the RAM 2020 can be considered to be a memory that temporarily holds the content of the external storage device during such a process, the RAM 2020 and such external storage devices are herein collectively referred to as memory, storage unit, or storage device. Various kinds of information such as programs, data, tables, databases in this embodiment are stored on such storage devices and are subjected to information processing. The CPU 2000 can also store a portion of the content of the RAM 2020 in a cache memory and can read and write data on the cache memory. In such a mode, the cache memory serves part of the function of the RAM 2020 and therefore the cache memory is also included with the RAM 2020, memories and/or storage devices.

The CPU 2000 performs various kinds of processing on data read out from the RAM 2020, including various computations, processes of information, condition judgments, search and replacement of information, in accordance with command sequences in programs and writes the results back to the RAM 2020. For example, when making a condition judgment, the CPU 2000 determines whether a variable of any type given in this embodiment meets a condition of being greater than, less than, no greater than, no less than, or equal to another variable or a constant. If the condition is met (or is not met), the CPU 2000 branches to another command sequence or calls a subroutine.

The CPU 2000 can search for information stored in a file, a database or the like in a storage device. For example, if a plurality of entries in each of which an attribute value of a first attribute is associated with an attribute value of a second attribute are stored in a storage device, the CPU 2000 can search for an entry containing an attribute value of the first attribute that matches a specified condition among the plurality of entries stored in the storage device and can read out an attribute value of the second attribute contained in the entry to obtain the attributed value of the second attribute associated with the first attribute that meets the predetermined condition.

The program or modules described above may be stored in an external recording medium. The recording medium may be an optical recording medium such as a DVD or CD, a magneto-optical disc such as an MO, a tape medium, or a semiconductor memory such as an IC card as well as a flexible disk and a CD-ROM 2095. A storage device such as a hard disk or a RAM provided in a server system connected to a private communication network or the Internet may be used as a recording medium to provide a program to the computer 1900 through the network.

While the present invention has been described with an embodiment thereof, the technical scope of the present invention is not limited to the scope described in the embodiment described above. It will be apparent to those skilled in the art that various modifications and improvements can be made to the embodiment described above. It will be apparent from the claims that such modified or improved embodiments can fall within the scope of the technical scope of the present invention.

It should be noted that the operations, procedures, steps, and stages of each process performed by an apparatus, system, program, and method shown in the claims, specification, or diagrams can be performed in any order unless the order is explicitly indicated by "before", "prior to" or the like or unless an output from a previous process is used in a subsequent process. Even if a process flow in the claims, specification and diagrams is described using phrases such as "first" or "then" for convenience, it does not necessarily mean that the process must be performed in that order.

What is claimed is:

1. A computer-implemented method within a computer hardware system including a first storage device and a second storage device separate from the first storage device, comprising:

collecting, for the first storage device, first access data indicating details of past accesses to the first storage device;

collecting, for the second storage device, second access data indicating details of past accesses to the second storage device;

receiving a request, from a user, to reserve a storage area for storing a new data set, wherein the request includes additional information that at least comprises an expected duration in which the new data set is expected to be used and an expected time range of a day in which the new data set is expected to be used each day in the expected duration;

computing, in response to the request, a predicted change in access frequency for the first storage device based on the additional information;

computing, in response to the request, a predicted change in access frequency for the second storage device based on the additional information;

selecting one of the first and second storage devices based upon the predicted changes for the first and second storage devices; and reserving the selected one of the first and second storage devices for storing the new data set.

2. The method of claim 1, wherein
the selected one of the first and second storage devices is selected based upon peak values of the predicted changes for the first and second storage devices.

3. The method of claim 1, wherein
the selected one of the first and second storage devices has a smallest peak value of the predicted changes for the first and second storage devices.

4. The method of claim 1, wherein
the selected one of the first and second storage devices is selected based upon an average value of the predicted changes for the first and second storage devices.

5. The method of claim 1, wherein
the selected one of the first and second storage devices is selected has a smallest average value of the predicted changes for the first and second storage devices.

6. The method of claim 1, wherein
the additional information included with the request further comprises at least one of:

which days of a week the new data set is expected to be used for the expected time range of a day in the expected duration, specific days of a year the new data set is expected to be used for the expected time range of a day in the expected duration, a required amount of free space required for storing the new data set, security requirements associated with the new data set, and a date the new data set must be retained in the first or second storage device until or an amount of time the new data set must be retained by the first or second storage device.

7. A computer hardware system, comprising:
a first storage device;
a second storage device separate from the first storage device; and
a hardware processor configured to execute the following operations:

collecting, for the first storage device, first access data indicating details of past accesses to the first storage device;

collecting, for the second storage device, second access data indicating details of past accesses to the second storage device;
receiving a request, from a user, to reserve a storage area for storing a new data set, wherein the request includes additional information that at least comprises an expected duration in which the new data set is expected to be used and an expected time range of a day in which the new data set is expected to be used each day in the expected duration;
computing, in response to the request, a predicted change in access frequency for the first storage device based on the additional information;
computing, in response to the request, a predicted change in access frequency for the second storage device based on the additional information;
selecting one of the first and second storage devices based upon the predicted changes for the first and second storage devices; and
reserving the selected one of the first and second storage devices for storing the new data set.

8. The system of claim 7, wherein the selected one of the first and second storage devices is selected based upon peak values of the predicted changes for the first and second storage devices.

9. The system of claim 7, wherein the selected one of the first and second storage devices has a smallest peak value of the predicted changes for the first and second storage devices.

10. The system of claim 7, wherein the selected one of the first and second storage devices is selected based upon an average value of the predicted changes for the first and second storage devices.

11. The system of claim 7, wherein the selected one of the first and second storage devices is selected has a smallest average value of the predicted changes for the first and second storage devices.

12. The system of claim 7, wherein the additional information included with the request further comprises at least one of:
   which days of a week the new data set is expected to be used for the expected time range of a day in the expected duration,
   specific days of a year the new data set is expected to be used for the expected time range of a day in the expected duration,
   a required amount of free space required for storing the new data set,
   security requirements associated with the new data set, and
   a date the new data set must be retained in the first or second storage device until or an amount of time the new data set must be retained by the first or second storage device.

13. A computer program product, comprising a non-transitory hardware storage device having stored therein program code, the program code, which when executed by a computer hardware system including a first storage device and a second storage device separate from the first storage device, causes the computer hardware system to perform:
collecting, for the first storage device, first access data indicating details of past accesses to the first storage device;
collecting, for the second storage device, second access data indicating details of past accesses to the second storage device;
receiving a request, from a user, to reserve a storage area for storing a new data set, wherein the request includes additional information that at least comprises an expected duration in which the new data set is expected to be used and an expected time range of a day in which the new data set is expected to be used each day in the expected duration;
computing, in response to the request, a predicted change in access frequency for the first storage device based on the additional information;
computing, in response to the request, a predicted change in access frequency for the second storage device based on the additional information;
selecting one of the first and second storage devices based upon the predicted changes for the first and second storage devices; and
reserving the selected one of the first and second storage devices for storing the new data set.

14. The computer program product of claim 13, wherein the selected one of the first and second storage devices is selected based upon peak values of the predicted changes for the first and second storage devices.

15. The computer program product of claim 13, wherein the selected one of the first and second storage devices has a smallest peak value of the predicted changes for the first and second storage devices.

16. The computer program product of claim 13, wherein the selected one of the first and second storage devices is selected based upon an average value of the predicted changes for the first and second storage devices.

17. The computer program product of claim 13, wherein the selected one of the first and second storage devices is selected has a smallest average value of the predicted changes for the first and second storage devices.

18. The computer program product of claim 13, wherein the additional information included with the request further comprises at least one of:
   which days of a week the new data set is expected to be used for the expected time range of a day in the expected duration,
   specific days of a year the new data set is expected to be used for the expected time range of a day in the expected duration,
   a required amount of free space required for storing the new data set,
   security requirements associated with the new data set, and
   a date the new data set must be retained in the first or second storage device until or an amount of time the new data set must be retained by the first or second storage device.

* * * * *